United States Patent
O'Neil

(10) Patent No.: US 8,227,050 B1
(45) Date of Patent: Jul. 24, 2012

(54) COATING COMPOSITION AND METHOD FOR COATING SUBSTRATES

(75) Inventor: James William O'Neil, Chadds Ford, PA (US)

(73) Assignee: E I du Pont de Nemours and Company, Wimington, DE (US)

( * ) Notice: Subject to any disclaimer, the term of this patent is extended or adjusted under 35 U.S.C. 154(b) by 1114 days.

(21) Appl. No.: 11/546,589

(22) Filed: Oct. 12, 2006

Related U.S. Application Data

(60) Provisional application No. 60/732,297, filed on Oct. 31, 2005.

(51) Int. Cl.
*B05D 3/00* (2006.01)
*B05D 1/00* (2006.01)
*B05D 1/36* (2006.01)

(52) U.S. Cl. .......... 427/559; 427/558; 524/129; 522/64; 526/193; 526/319; 526/328.5; 526/329.7; 528/144; 528/159; 106/400

(58) Field of Classification Search ................. 524/129; 522/64; 526/193, 319, 328, 328.5, 329.7; 528/144, 159; 106/400; 427/558, 559
See application file for complete search history.

(56) References Cited

U.S. PATENT DOCUMENTS

| | | | |
|---|---|---|---|
| 6,251,963 B1 * | 6/2001 | Kohler et al. | 522/64 |
| 6,395,822 B1 * | 5/2002 | Edgington | 524/523 |
| 6,432,612 B1 * | 8/2002 | Hamada et al. | 430/280.1 |
| 6,838,177 B2 | 1/2005 | Fenn et al. | |
| 2003/0059555 A1 * | 3/2003 | Fenn et al. | 427/558 |
| 2004/0254257 A1 | 12/2004 | Laginess et al. | |
| 2005/0095371 A1 | 5/2005 | Braun et al. | |

\* cited by examiner

*Primary Examiner* — James J Seidleck
*Assistant Examiner* — Deve E Valdez
(74) *Attorney, Agent, or Firm* — Brian J Myers

(57) ABSTRACT

The present invention is directed to a UV curable coating composition, which includes one or more monomers, one or more multifunctional oligomers, one or more pigments, one or more photoinitiators, and volatile organic solvent. The coating composition can be used as a primer in repairing and refinishing automobiles. The coating composition provides short drying times and a cured coating that does not need to be wiped. A method of applying the coating composition is also provided.

14 Claims, No Drawings

COATING COMPOSITION AND METHOD FOR COATING SUBSTRATES

CROSS-REFERENCE TO RELATED APPLICATION

This application claims priority under 35 U.S.C. §119 from U.S. Provisional Application Ser. No. 60/732,297, filed Oct. 31, 2005.

FIELD OF THE INVENTION

The present invention relates to coating compositions and more specifically to radiation curable coating compositions used in automotive refinish and OEM applications. The present invention also relates to a method of radiation-cured coating on substrates, such as automotive bodies.

BACKGROUND OF THE INVENTION

Coatings used during the repair of damaged motor vehicles generally include several layers of different coating compositions. The initial coating is usually a primer coating resulting from a coating composition formulated as a primer. Once the gross damage to the underlying substrate has been fixed, a primer layer is applied over the repaired surface. The primer layer is then cured to form a primer coating. The primer coating provides adhesion to the substrate, which can be bare metal, plastic, primed plastic, an electrodeposition layer, primer, topcoat, clearcoat or a combination of these coats. The primer composition is applied to the substrate in a relatively thick layer so that the premier coating resulting therefrom can be readily sanded (also known as 'flattened') using sand- or glass-paper to obliterate minor imperfections in the substrate and provide a smooth surface for subsequent coatings. The primer commonly contains pigments, fillers, or a combination thereof for ease of sandability. Typically, the thickness of the primer coating ranges from 50 to 200 μm. Over the primer coating, a topcoating is applied which itself can result from more than one type of coating compositions, such as such as basecoat and clearcoat compositions.

U.S. 6,838,177 describes a process for priming a surface using a UV curable primer wherein the ratio of UV-B to UV-A radiation in the radiation source is 1:1 or less. As taught by the examples in the '177 patent, all of the cured coating compositions need to be wiped with a solvent to remove sticky uncured surface layer prior to further processing.

It would be desirable to have a coating composition that can be readily cured by using visible light or UV radiation that has essentially no UV-B radiation into a dry-to-the touch coating after a cure time ranging from 30 seconds to 10 minutes without the need to wipe the surface to remove uncured portions of the coating composition. The inventive coating composition has the aforementioned abilities.

STATEMENT OF THE INVENTION

According to the present invention, there is provided a coating composition, which upon cure forms a coating, said composition comprising:
I) a component A comprising in the range of from 0.01 percent to 10 percent of one or more monomers;
II) a component B comprising in the range of from 5.0 percent to 50.0 percent of one or more multifunctional oligomers;
III) a component C comprising in the range of from 10.0 percent to 70.0 percent of one or more pigments, fillers or a combination thereof;
IV) a component D comprising in the range of from 0.5 percent to 15 percent of one or more photoinitiators; and
V) a component E comprising in the range of from 20.1 percent to 50.0 percent of volatile organic solvent, wherein all of said percentages are in weight percent based on the total weight of the composition.

The present invention also provides a method of producing a coating on the surface of a substrate comprising:
i) applying a coating composition to form a layer on said surface, said composition comprising:
I) a component A comprising in the range of from 0.01 percent to 10 percent of one or more monomers;
II) a component B comprising in the range of from 5.0 percent to 50.0 percent of one or more multifunctional oligomers;
III) a component C comprising in the range of from 10.0 percent to 70.0 percent of one or more pigments, fillers or a combination thereof;
IV) a component D comprising in the range of from 0.5 percent to 15 percent of one or more photoinitiators; and
V) a component E comprising in the range of from 20.0 percent to 50.0 percent of volatile organic solvent, wherein all of said percentages are in weight percent based on the total weight of the composition; and
ii) exposing said layer to actinic radiation; and
iii) curing said exposed layer to form said coating on said surface of said substrate.

The method may optionally also comprise the steps of:
iv) sanding the surface of said coating;
v) applying a layer of a basecoat composition over said sanded surface; and
vi) applying a layer of clearcoat composition over said basecoat composition; and
vii) curing said layer of basecoat composition and said clearcoat composition to form a multilayer coating on said substrate.

The method may optionally also comprise the steps of:
iv) sanding the surface of said coating
v) applying a layer of basecoat composition or a clearcoat composition over said sanded surface; and
vi) curing said layer of said basecoat composition or said clearcoat composition to form a multilayer coating on said substrate.

The method may optionally also comprise the steps of:
iv) drying said layer before said iii) curing step or during said iii) curing step.

The method of the invention is well suited for refinishing application, such as that of a vehicle.

DETAILED DESCRIPTION OF THE PREFERRED EMBODIMENT

As used herein:

"Actinic radiation" means radiation that causes, in the presence of a photoinitiator, the polymerization of monomers that have ethylenically unsaturated double bonds. Sources of actinic radiation may be natural sunlight or artificial light sources. Preferred actinic radiation is UV-A radiation, which falls within the wavelength range of from 320 nanometers (nm) to 400 nm. UV-B radiation is radiation having a wavelength falling in the range of from 280 nm to 310 nm. UV-C radiation is radiation having a wavelength falling in the range of from 100 nm to 280 nm. Many artificial light sources emit a spectrum of radiation that contains UV radiation having wavelengths at lower than 320 nm. Actinic radiation of wavelengths lower than 320 nm is generally not preferred as it causes damage to the skin and eyes. In a body shop, the use of UV-A lamps that do not produce UV-B or UV-C radiation or the use of lamps from which UV-B and UV-C radiation has been filtered out requires less safety equipment than the lamps that produce UV-B or higher frequency radiation. The light sources that produce UV-B and higher radiation need to be adequately shielded or have their own enclosures so that they do not harm workers in the shop.

The phrase "dry-to-touch" means when the surface of a cured coating is touched with an object such as, a dry finger, gauze, or cotton swab, no visible marks appear on the surface.

The phrase "tacky" means when the surface of a cured coating is touched with an object such as, a dry finger, gauze, or cotton swab, visible marks appear on the surface. The tacky layer may be fluid enough to flow and consequently heal, such that any visible marks on the surface of the tacky layer are no longer visible. Tackiness can be the consequence of a layer that has not fully cured and is thus not preferred in the refinish applications. Therefore, tacky material from the surface of a coating needs to be removed prior to sanding the coating or prior to applying subsequent coatings over the tacky coating.

"(Meth)acrylate" is used to mean both acrylates and methacrylates. For example, methyl (meth)acrylate is meant to encompass both methyl acrylate and methyl methacrylate.

"GPC Number average molecular weight" and "GPC weight average molecular weight" can be determined by gel permeation chromatography (GPC) using a high performance liquid chromatograph (HPLC) supplied by Hewlett-Packard, Palo Alto, Calif. Unless stated otherwise, the liquid phase used was tetrahydrofuran and the standard used was polystyrene.

The uses of numerical values in the various ranges specified herein are stated as approximations as though the minimum and maximum values within the stated ranges were both being preceded by the word "about." In this manner, slight variations above and below the stated ranges can be used to achieve substantially the same results as values within the ranges. Also, the disclosure of these ranges is intended as a continuous range including every value between the minimum and maximum average values including fractional values that can result when some of components of one value are mixed with those of different value. Moreover, when broader and narrower ranges are disclosed, it is within the contemplation of this invention to match a minimum value from one range with a maximum value from another range and vice versa.

According to the present invention, there is provided a coating composition, which upon cure forms a coating on a substrate surface. The composition includes components A, B, C, D and E, all of which are described below:

The component A comprises in the range of from 0.01 percent to 10 percent of one or more monomers. As used herein, the term "monomer" means a monomer that has on average, 0.5 to 1.5, preferably 0.9 to 1.1, and more preferably 1.0 of ethylenically unsaturated groups per monomer molecule. These compounds are commonly referred to as monoolefins. Ethylenically unsaturated group means a moiety in a molecule that includes a carbon-carbon double bond that is capable of reacting via a free radical polymerization mechanism.

Suitable examples of the component A can include monoolefins or ethylenically unsaturated aliphatic compounds such as 1-octene, 1-hexene and 1-decene, vinyl esters such as vinyl acetate, styrene, substituted styrenes such as alpha-methyl styrene or p-methyl styrene, esters of methacrylic acid and esters of acrylic acid. Preferably component A consists principally of alkyl esters of acrylic acid such as butyl (meth)acrylate, t-butyl (meth)acrylate, isobomyl (meth) acrylate, isodecyl (meth)acrylate, 2-ethylhexyl (meth)acrylate, lauryl (meth)acrylate, cyclohexyl (meth)acrylate and octyl (meth)acrylate. More preferably component A consists principally of isobomyl (meth)acrylate and/or 2-ethylhexyl (meth)acrylate. Preferably, the coating composition contains in the range of from 0.01 percent to 10 percent of one or more monomers. More preferably, the coating composition contains in the range of from 1.0 percent to 8.0 percent of one or more monomers. Most preferably, the coating composition contains in the range of from 2.0 percent to 5.0 percent of one or more monomers. All of said percentages are in weight percent based on the total weight of the composition.

The component B comprises in the range of from 5.0 percent to 50.0 percent by weight of one or more multifunctional oligomeric (meth)acrylates. More preferably, the composition contains in the range of from 10.0 percent to 40.0 percent of one or more multifunctional oligomers. All of said percentages are in weight percent based on the total weight of the composition. Multifunctional oligomeric (meth)acrylate means an oligomer preferably having a GPC number average MW from 200 to 8000 that has on average in the range of from 1.9 to 12 ethylenically unsaturated groups per molecule, more preferably, the multifunctional oligomeric (meth)acrylate have, on average, in the range of from 3.0 to 6.0 ethylenically unsaturated groups per molecule. Preferably, the ethylenically unsaturated groups are (meth)acrylate esters. Particularly useful are multifunctional (meth)acrylic oligomers, such as epoxy (meth)acrylates obtained, for example, by reacting a compound containing multiple epoxy groups with (meth)acrylic acid. Suitable epoxy (meth)acrylates include UVE 100® and UVE 150® available from Croda, Edsion, N.J.; or Actilane 251®, Actilane 320® or Actilane 330® available from Akcros Chemicals, New Brunswick, N.J. Other suitable oligomeric (meth)acrylates include urethane (meth)acrylates such as Ebecryl 264® available from UCB Chemicals, Inc, Smyrna, Ga. the Roskydals® available from Bayer MaterialScience, Pittsburgh, Pa.; polyester (meth) acrylate oligomers, ester epoxy (meth)acrylate oligomers, and urethane (meth)acrylate oligomers all three types are available from the Sartomer Co. Exton, Pa.; or unsaturated polyesters such as polyesters prepared with maleic anhydride as one of the monomeric components. Preferably component B includes one or more epoxy (meth)acrylates, more preferably component B includes one or more epoxy (meth)acrylates and one or more urethane (meth)acrylates.

The component B can optionally include one or more multifunctional ethylenically unsaturated monomeric compounds. Multifunctional ethylenically unsaturated monomeric compounds means a compound having on average in the range of from 1.9 to 12 ethylenically unsaturated groups per molecule. The ethylenically unsaturated groups are preferably, but are not limited to, (meth)acrylic groups. Suitable multifunctional ethylenically unsaturated monomeric compounds can include pentaerythritol tri(meth)acrylate, trimethylolpropane tri(meth)acrylate, 1,6-hexanediol di(meth) acrylate, trimethylolpropane ethoxylate tri(meth)acrylate, thiodiethylene glycol di(meth)acrylate, tetraethylene glycol di(meth)acrylate, tripropylene glycol di(meth)acrylate, triethylene glycol di(meth)acrylate, trimethylpropane tri(meth) acrylate, dipentaerythritol penta(meth)acrylate and pentaerythritol ethoxylate tetra(meth)acrylate, bisphenol-A di(meth)acrylate, 4,4'-bis(2-(meth)acryloyloxyethoxy) diphenylpropane, vinyl (meth)acrylate, divinyl-benzene, divinyl succinate, diallyl phthalate, triallyl phosphate, triallyl isocyanurate and tris(2-(meth)acryloylethyl)isocyanurate, alkoxylated trimethylolpropane tri(meth)acrylate or pentaerythritol tri(meth)acrylate, pentaerythritol tetra(meth)acrylate or dipentaerythritol hexa(meth)acrylate. If present, the preferred multifunctional ethylenically unsaturated monomeric compound is pentaerythritol ethoxylate tetra(meth)acrylate, which is available as SR494® from the Sartomer Co., Exton, Pa.

Preferably, the components A and B are both liquids at room temperature.

The component C comprises in the range of from 10.0 percent to 70.0 percent by weight of one or more pigments or fillers or a combination thereof. Preferably, the coating composition contains in the range of from 15.0 percent to 50.0 percent by weight of pigments or fillers, and more preferably, the coating composition contains in the range of from 20.0 percent to 40.0 percent by weight of the pigments or fillers. All of said percentages are in weight percent based on the total weight of the composition. Generally any known pigment or filler can be used as the component C. Conventional pigments, such as titanium dioxide, zinc phosphate, zinc sulfide, zinc oxide, barium sulfate, and corrosion inhibiting pigments can be included. Suitable fillers include clays, barytes, mica, talcs, magnesium silicate, and calcium carbonate. China clay, a hydrated aluminum silicate obtained from sedimentary kaolin clays is preferred as clay. An example of a suitable china clay is available from ECC International, Cornwall, United Kingdom. The component C can include those pigments that are known to inhibit corrosion such as, strontium chromate, zinc phosphate and barium metaborate. Preferred pigments and fillers are those that are substantially inert to the free radical species produced during the curing process. Preferably the component C can include zinc oxide, titanium dioxide, zinc phosphate, zinc sulfide, barium sulfate, magnesium silicate, china clay and corrosion inhibiting pigments. More preferably component C can include barium sulfate, talc or a combination thereof, and corrosion inhibiting pigments.

The component D can include any photoinitiators that are capable of generating free radicals when exposed to visible light and/or UV-A radiation. A preferred class of photoinitiator is bisacyl phosphine oxides, such as, for example, Irgacure 819® photoinitiator available from Ciba Specialty Chemicals Corporation, Tarrytown, New York.

The coating composition contains in the range of from 0.5 percent to 15.0 percent by weight of the photoinitiator, preferably, it contains in the range of from 0.9 percent to 10.0 percent by weight of the photoinitiator, and more preferably, it contains in the range of from 1.0 to 8.0 percent by weight of the photoinitiator. All of said percentages are in weight percent based on the total weight of the composition.

The component E includes a volatile organic solvent present in the amount ranging from 20.1 percent to 50.0 percent by weight, preferably 21 percent to 40 percent by weight of the total composition. More preferably, the volatile organic solvent is present in the amount ranging from 23 percent to 35 percent by weight of the total composition. The volatile organic solvent can be any volatile organic solvent that will dissolve components A, B, and D. Non-limiting examples of suitable volatile organic solvents include aliphatic or aromatic hydrocarbons such as Solvesso 100® supplied by Exxon Mobile, Houston, Texas; toluene or xylene; alcohols, such as butanol or isopropanol; esters such as, butyl acetate, propyl acetate, or ethyl acetate; ketones, such as acetone, methyl isobutyl ketone or methyl ethyl ketone, ethers, ether-alcohols; or ether-esters, such as ethyl 3-ethoxypropionate; or a mixture of any of the aforedescribed volatile organic solvents. Preferably, propyl acetate, acetone, methyl ethyl ketone, ethyl 3-ethoxypropionate, xylene, or a mixture thereof is used as the volatile organic solvent.

The level and type of volatile organic solvent solvent used will depend on the viscosity of the other components utilized in the coating composition and the intended application method used in applying the coating composition over substrate surfaces.

The coating composition can also contain, as a component F, conventional additives such as, photosynergists, adhesion promoters, pigment dispersants, flow aids, wetting aids and rheology modifiers. The coating composition can contain in the range of from 0.01 percent to 15 percent by weight of the conventional additives.

A preferred embodiment of the coating composition contains:
 I. in the range of from 1 percent to 8 percent by weight of the component A;
 II. in the range of from 10 percent to 40 percent by weight of the component B;
 III. in the range of from 15 percent to 50 percent by weight of the component C;
 IV. in the range of from 0.9 percent to 10 percent by weight of the component D,
 V. in the range of from 21 to 30 percent by weight of the component E; and
 VI. in the range of from 0.1 percent to 15 percent by weight of the component F.

It is understood that if one chooses an amount that is in the upper range of one component than the amounts of the other components should be lowered accordingly. Thus, should any combinations in the recited ranges of the components A through F, when added, total more than 100, they are to be discarded. Thus, the sum of the percent by weight of components A, B, C, D, E, and F must always add up to 100 percent by weight.

The present invention is also directed to a method of producing a coating on the surface of a substrate, such as an automotive body. The method includes:
 i) applying the coating composition described earlier to form a layer on said surface
 ii) exposing said layer to actinic radiation; and
 iii) curing said exposed layer to form said coating on said surface of said substrate.

The method can optionally also include the steps of
 iv) sanding the surface of said coating;
 v) applying a layer of a basecoat composition over said sanded surface;
 vi) applying a layer of clearcoat composition over said basecoat composition; and
 vii) curing said layer of basecoat composition and said clearcoat composition to form a multilayer coating on said substrate.

The method can optionally also comprise the steps of:
 iv) sanding the surface of said coating
 v) applying a layer of basecoat composition or a clearcoat composition over said sanded surface; and
 vi) curing said layer of said basecoat composition or said clearcoat composition to form a multilayer coating on said substrate.

The method can optionally also include the steps of:
 iv) drying said layer before said iii) curing step or during said iii) curing step.

The coating composition can be applied by conventional means, such as by brush, roller, sponge, spray gun or aerosol, preferably spray gun or aerosol. When applied as an aerosol, the composition additionally includes one or more propellants and additional solvent. Suitable propellants for aerosol application can include dimethyl ether, propane, and chlorofluorocarbons, compressed air, nitrogen and a combination thereof. The substrate can be for example, metal, plastic, wood or glass. A suitable film thickness can be achieved as a result of one single application or several applications.

The coating composition is cured by exposure to actinic radiation. When several applications are used, the composition can be cured after each application or it can be cured only after the final application. The actinic radiation has essentially no UV-B or UV-C radiation. The shorter wavelengths of UV-B and UV-C radiation are generally not preferred as these cause more damage to the skin and eyes than does visible light or UV-A radiation. It may be necessary to place a filter over an artificial light source to remove the actinic radiation below the wavelength of 320nm.

Sunlight or any suitable UV lamp can provide the desired actinic radiation. Preferably the lamp(s) are positioned so that they are between 5 centimeters (cm) and 60 cm (between 2 inches and 24 inches) away from the surface of the primer. More preferably the lamp(s) are positioned so that they are from 10 cm to 30 cm away from the surface of the primer.

Preferably the layer of the coating composition applied over the substrate is cured by exposure to the actinic radiation for a duration ranging from 30 seconds to 10 minutes, preferably from 1 minute to 3 minutes. The duration needed to cure the composition will vary depending upon many factors as will be apparent to one of ordinary skill in the art. The duration can also vary depending upon the substrate temperature, thickness of the applied layer, power of the actinic source, such as a lamp, distance of the lamp to the substrate, and the size of the repair. Obviously, if the size of the area to be cured is larger than the projection area of the lamp, then the edges of the repair area will not be cured. One would have to move the lamp further from the substrate to increase the area covered by the lamp or provide more than one lamp to cure the entire repair surface. Alternatively, a large area may be cured by moving the lamp around the entire repair taking care that the applied composition has been exposed to radiation for at least 30 seconds or more depending upon the factors mentioned above. In another alternative, the repair may be cured in sections. The resultant coating can range from 25 microns to 200 microns in thickness. If desired, the layer of the coating composition can be dried by conventional means, such as forced air from a fan, before it is subjected to the aforedescribed-curing step. The layer may also be dried by the aforedescribed conventional methods during the aforedescribed curing step.

If desired, the coating of the present composition can be sanded by such conventional means as sand-paper or glass-paper and a layer of conventional basecoat composition desirably followed by a layer of conventional clearcoat composition can be applied over the sanded surface of the coating, which can then be conventionally cured to form a multilayer coating on substrate. Suitable conventional curing step can occur under conventional ambient conditions or at elevated bake temperatures.

Commercial compositions often rely upon using relatively large amounts of low molecular weight monomers to lower the coating composition viscosity.

However, using relatively large amounts of low molecular weight monomers produces a layer that will not adhere to a vertical surface prior to curing i.e., it can have too much sag. Thus, the use of relatively large amounts of low molecular weight monomers is typically balanced with using high molecular weight monomers or by using oligomeric monomers at the same or close to the same percentage as the low molecular weight monomers to increase the application viscosity of the coating composition. Such compositions do not typically sag on vertical surfaces. However, specialized equipment is needed to minimize the presence of oxygen from air at the surface of the surface to adequately cure such coatings. If the amount of oxygen is not minimized during the curing process, the coatings need to be wiped to remove uncured low molecular monomers after the curing process. The uncured low molecular weight monomers cause the coating surface to be tacky. As a result, it is generally unsuitable for overcoating with another coating composition, such as basecoat composition until the uncured portion of the composition is removed from the coating, usually by wiping with a solvent.

It is surprising that the present composition coating composition that includes greater than 20% by weight solvent can result in an acceptable layer that cures completely to a dry-to-touch and sandable state utilizing short dry and cure times while having no portion of the coating that is tacky, which typically needs to be removed by wiping. While not wishing to be bound by any one theory, it is believed that by using a larger percentage of multifunctional oligomeric (meth)acrylates included in the component B, than monomers included in the component A, the resulting coating composition has a fast cure rate, typically within 30 seconds to 10 minutes. Moreover, the resultant coating does not require to be wiped. Thus, the current inventive coating composition can be applied to a vertical surface without sag.

Preferably, the coating composition of the present invention is used as a primer composition in the refinishing of automotive vehicles. A primer coating from the present coating composition can be coated with any suitable refinish system in order to achieve the desired final color and appearance. For example, the primer can be coated with a basecoat composition, such as ChromaBase® available from DuPont Company, Wilmington, Delaware followed by a clearcoat composition, such as ChromaClear® 7600S available from DuPont Company.

The method is particularly suited to, but not limited to, carrying out spot repairs to damaged vehicles. A spot repair refers to a repair of damage that is limited to small area of a vehicle panel, usually less than 40 square centimeters.

According to the present invention there is also provided a substrate, such as automobile body that has been coated or partially coated by the method of the invention.

EXAMPLE

Unless otherwise specified, all chemicals are available from the Aldrich Chemical Company, Milwaukee, Wisconsin.

A coating composition is produced by using the following ingredients:

| Ingredient | Parts by weight |
|---|---|
| n-propyl acetate | 24.8 |
| Ester epoxy Acrylate[1] | 11.1 |
| Urethane Acrylate[2] | 11.1 |
| Isobornyl acrylate | 2.6 |
| Ebecryl 171[3] | 9.2 |
| Irgacure 819[4] | 2.1 |
| Barium Sulfate | 13.0 |
| Bayferrox 316[5] | 0.1 |
| Magnesium Silicate | 17.3 |

-continued

| Ingredient | Parts by weight |
|---|---|
| Titanium Dioxide[6] | 0.3 |
| Zinc Phosphate | 6.2 |
| Zinc Oxide | 0.1 |
| Anti-Terra U[7] | 0.2 |

[1]Roskydal ® UABPLS 2266 from Bayer Materials Science, Pittsburgh, Pennsylvania.
[2]Roskydal ® UABPLS 2258 from Bayer Materials Science, Pittsburgh, Pennsylvania.
[3]Available from Cytec Industries, Stamford, Connecticut.
[4]Irgacure ® 819 is available form Ciba Specialty Chemicals, Tarrytown, New York.
[5]Bayferrox ® 316 available from Lanxess, Pittsburgh, Pennsylvania.
[6]R-902 available from DuPont, Wilmington, Delaware.
[7]Available from Byk Chemie, Wallingford, Connecticut.

The aforedescribed ingredients are added in the order listed to a metal can having a chemically inert liner. The metal can is equipped with a stirrer and a cover to prevent light from entering the vessel. After all the ingredients are mixed, the composition is placed in a media mill containing 1 mm glass beads and is milled without significant loss of solvent. Any solvent lost due to evaporation is replenished. The coating composition is applied using a conventional spray gun over a cleaned and sanded 10.16 cm by 15.24 cm (4 inches×6 inches) cold rolled steel panel. Two layers of the composition are sequentially applied over the panel with a two-minute interval between the layers. After the application of the second layer, the panel is allowed to dry for 5 minutes at 23° C. (75° F.). The panel is then placed 25.4 cm (10 inches) away from a UV-A-400 lamp (available from H&S Autoshot, Centerville, IA, the lamp is equipped with a filter, provided by H&S Autoshot, allowing only visible and UV-A light transmission). The sequentially applied layers of the coating composition on the panel are then exposed to the actinic radiation from the UV lamp for one minute and then allowed to cool.

The invention claimed is:

1. A coating composition, which upon cure forms a coating, said composition consisting essentially of:
   I) a component A comprising in the range of from 0.01 percent to 10 percent of one or more monomers;
   II) a component B comprising in the range of from 5.0 percent to 50.0 percent of one or more multifunctional oligomers;
   III) a component C comprising in the range of from 10.0 percent to 70.0 percent of one or more pigments, fillers or a combination thereof;
   IV) a component D comprising in the range of from 0.5 percent to 15 percent of one or more photoinitiators; and
   V) a component E comprising in the range of from 21 percent to 40 percent of volatile organic solvent, wherein all of said percentages are in weight percent based on the total weight of the composition; and
   wherein, the cured coating composition is free from any sticky, uncured material.

2. The composition of claim 1 wherein said multifunctional oligomer further comprises one or more multifunctional monomers.

3. The composition of claim 1 wherein said photoinitiator is a bisacyl phosphine oxide.

4. The composition of claim 1 further comprising in the range of from 0.01 percent to 15 percent by weight of conventional additives wherein all of said percentages are in weight percent based on the total weight of the composition.

5. The composition of claim 1 wherein said multifunctional oligomer comprises one or more oligomeric acrylates or methacrylates having a weight average molecular weight in the range of from 200 to 8000.

6. The composition of claim 1 wherein said monomer comprises in the range of from 1.0 percent to 8.0 percent by weight one or more monomers, wherein all of said percentages are in weight percent based on the total weight of the composition.

7. The composition of claim 1 or 6 wherein said monomer is one or more of the compounds selected from the groups consisting of isobornyl acrylate, isobornyl methacrylate, 2-ethyl hexyl acrylate, and 2-ethyl hexyl methacrylate, or a combination thereof.

8. The composition of claim 1 or 5 wherein said multifunctional oligomer comprises in the range of from 10.0 percent to 40.0 percent by weight one or more multifunctional oligomers wherein all of said percentages are in weight percent based on the total weight of the composition.

9. The composition of claim 1 wherein said pigments or fillers comprises in the range of from 15.0 percent to 50.0 percent of by weight one or more said pigments or fillers or combinations thereof, wherein all of said percentages are in weight percent based on the total weight of the composition.

10. The composition of claim 1 wherein said photoinitiator comprises in the range of from 0.9 percent to 10.0 percent by weight of one or more said photoinitiators wherein all of said percentages are in weight percent based on the total weight of the composition.

11. The composition of any one of claims 5, 6, 9, or 10 further comprising in the range from 0.01 percent to 15 percent by weight of conventional additives wherein all of said percentages are in weight percent based on the total weight of the composition.

12. The composition of claim 1 formulated as an automotive coating composition.

13. The composition of claim 2 wherein said multifunctional monomer is pentaerythritol ethoxylate tetraacrylate.

14. The coating composition of claim 1 comprising in the range of from 23 percent to 35 percent by weight of volatile organic solvent, wherein all of said percentages are in weight percent based on the total weight of the composition.

* * * * *